(12) United States Patent
Sadiq

(10) Patent No.: US 9,082,121 B2
(45) Date of Patent: Jul. 14, 2015

(54) SYSTEM AND METHOD FOR GUIDED PASSCODE ENTRY

(71) Applicant: MasterCard International Incorporated, Purchase, NY (US)

(72) Inventor: Mohammed Sadiq, Dubai (AE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 14/060,726

(22) Filed: Oct. 23, 2013

(65) Prior Publication Data

US 2015/0112872 A1    Apr. 23, 2015

(51) Int. Cl.
*G06Q 20/00* (2012.01)
*G06Q 20/40* (2012.01)

(52) U.S. Cl.
CPC .................................. *G06Q 20/4012* (2013.01)

(58) Field of Classification Search
CPC .............. G06Q 20/3821; G06Q 30/02; G06K 7/10722; G06K 7/10732; G06K 7/10742; G06K 7/10712; G06K 7/10792; G06K 7/10851; G06K 9/00013; G06K 9/00087; G06K 9/6255; H04L 63/0861; H04L 12/5601
USPC ....... 713/183, 184; 705/67; 726/18; 235/379; 455/411
See application file for complete search history.

(56) References Cited

U.S. PATENT DOCUMENTS

| | | | |
|---|---|---|---|
| 5,251,259 A * | 10/1993 | Mosley | 713/184 |
| 5,428,349 A * | 6/1995 | Baker | 340/5.54 |
| 6,209,104 B1 * | 3/2001 | Jalili | 726/18 |
| 6,213,391 B1 * | 4/2001 | Lewis | 235/380 |
| 7,155,416 B2 * | 12/2006 | Shatford | 705/67 |
| 7,295,832 B2 * | 11/2007 | Hewel | 455/411 |
| 7,481,360 B1 * | 1/2009 | Ramachandran et al. | 235/379 |
| 8,127,141 B2 * | 2/2012 | Hypponen | 713/184 |
| 8,811,609 B2 * | 8/2014 | Park et al. | 380/43 |
| 8,813,219 B2 * | 8/2014 | Natividad | 726/18 |
| 2006/0143138 A1 * | 6/2006 | Uehara | 705/67 |
| 2007/0136211 A1 * | 6/2007 | Brown et al. | 705/75 |
| 2012/0078795 A1 * | 3/2012 | Mann et al. | 705/44 |
| 2012/0124654 A1 * | 5/2012 | Senac | 726/7 |
| 2013/0339746 A1 * | 12/2013 | Ignatchenko | 713/183 |

* cited by examiner

*Primary Examiner* — John Hayes
*Assistant Examiner* — El Mehdi Oussir
(74) *Attorney, Agent, or Firm* — Leason Ellis LLP

(57) ABSTRACT

Systems and methods are provided for facilitating guided entry of a passcode. The exemplary guided passcode entry system provides additional security to traditional secret PIN or passcode entry systems by generating a randomized input sequence (order of entry) and prompting the user to input the passcode according to the randomized input sequence. The system also causes a test of the user's input data against a database of passcodes associated with the particular user for an exact match. The testing step can include comparing the characters of the input data to a particular passcode associated with the user which is stored in a database in accordance with the randomized input sequence in regard to the order that the input data was received. Based on the comparison of the received pin to the stored pin, the system can advance the transaction with the user.

16 Claims, 6 Drawing Sheets

SYSTEM AND METHOD FOR GUIDED PASSCODE ENTRY

TECHNICAL FIELD OF THE DISCLOSURE

This specification relates to the field of secure computing systems and, in particular, to facilitating secure entry of passcodes for authentication, identification, or verification of an account holder.

BACKGROUND OF THE DISCLOSURE

Automated Teller Machines (ATMs) provide an interface that allows credit card and debit card users to receive and/or deposit funds. During typical use of ATMs, and other transaction systems like a merchant point-of-sale device (POS), a user typically provides a transaction card, such as a debit card and/or credit card having account information embedded therein. The account information can include a card number, the account holder's name, and the like. To complete the transaction, the user often has to enter in a secure passcode such as a personal identification number (PIN) to authenticate the transaction.

One issue with ATMs is that they are vulnerable to fraud. Fraudsters often attach scanning devices to an ATM to read a transaction card and record the embedded account information, and also obtain the user's PIN number by watching or recording video of the user entering the PIN on the ATM keypad. Once the fraudster has the account information and PIN, the fraudster has access to the user's account. Similarly, other systems in which a user enters a password, PIN, log-in or other private information are similarly susceptible to fraud. For example, a fraudster can obtain a user's secure website log-in and password by watching the user input the private information on a computer.

Accordingly, there is a need for systems and methods that are less susceptible to fraud from recording or viewing a user input his/her private passcodes.

It is with respect to these and other considerations that the disclosure made herein is presented.

SUMMARY OF THE DISCLOSURE

Technologies are presented herein in support of systems and methods for guided entry of a passcode. The method includes displaying a randomized input sequence on a screen of a terminal, such as an ATM or computing device. The method also includes receiving input data at the terminal from an account holder comprising characters of the passcode input in an order. The method also includes causing a test (e.g., a verification) of the input data against a database of passcodes associated with account holders. Each passcode associated with an account holder includes a plurality of prescribed passcode characters having a prescribed position in a prescribed input order. The testing step includes comparing the characters of the input data to a particular passcode associated with the account holder stored in the database. Because the input data was entered by the user according to the randomized input sequence, the input data is compared in accordance with the randomized input sequence, and in regard to the order that the input data was received. The method also includes advancing the secure transaction at the terminal in response to any exact match of the received input data to the particular passcode.

In one implementation, the step of establishing the randomized input sequence can include generating the randomized input sequence at the terminal or at a remote server, using, for example, a pseudo-random number generator.

In another implementation, the randomized input sequence is a randomly arranged sequence of digits in the range 1 to N, wherein N is the number of prescribed passcode characters and wherein each digit is equivalent to one of the prescribed positions in the prescribed input order. Moreover, displaying the randomized input sequence can include iteratively displaying each of the digits according to the randomly arranged sequence. Accordingly the account holder is prompted to enter, for each of the displayed digits, a particular prescribed passcode character having a particular prescribed position that is equivalent to the displayed digit.

These and other aspects, features, and advantages can be appreciated from the accompanying description of certain embodiments of the disclosure and the accompanying drawing figures and claims.

DETAILED DESCRIPTION OF CERTAIN EMBODIMENTS OF THE INVENTION

By way of overview and introduction, various systems and methods are described herein that facilitate and enable guided entry of a passcode, for example a personal identification number ("PIN") in connection with a secure transaction. The exemplary guided passcode entry system provides additional security to traditional secret PIN or password entry systems by generating a randomized input sequence (order of entry) and prompting the user to input the PIN according to the randomized input sequence, and authorizes the transaction according to the received PIN. Accordingly, a fraudster who obtains the digits of a user's PIN will not automatically know the particular order of entry and cannot gain access to the user's account as easily as in traditional PIN entry systems. Transaction terminals implementing user-account and secret PIN entry authorization process, including ATM's, point-of-sale systems, secure access points (e.g., electronically locked doors), and other computing devices, are widely implemented. The embodiments disclosed herein improve the security of using such terminals through modification of the PIN entry process, thereby providing improved security with a relatively low barrier to implementation.

Figure 1:
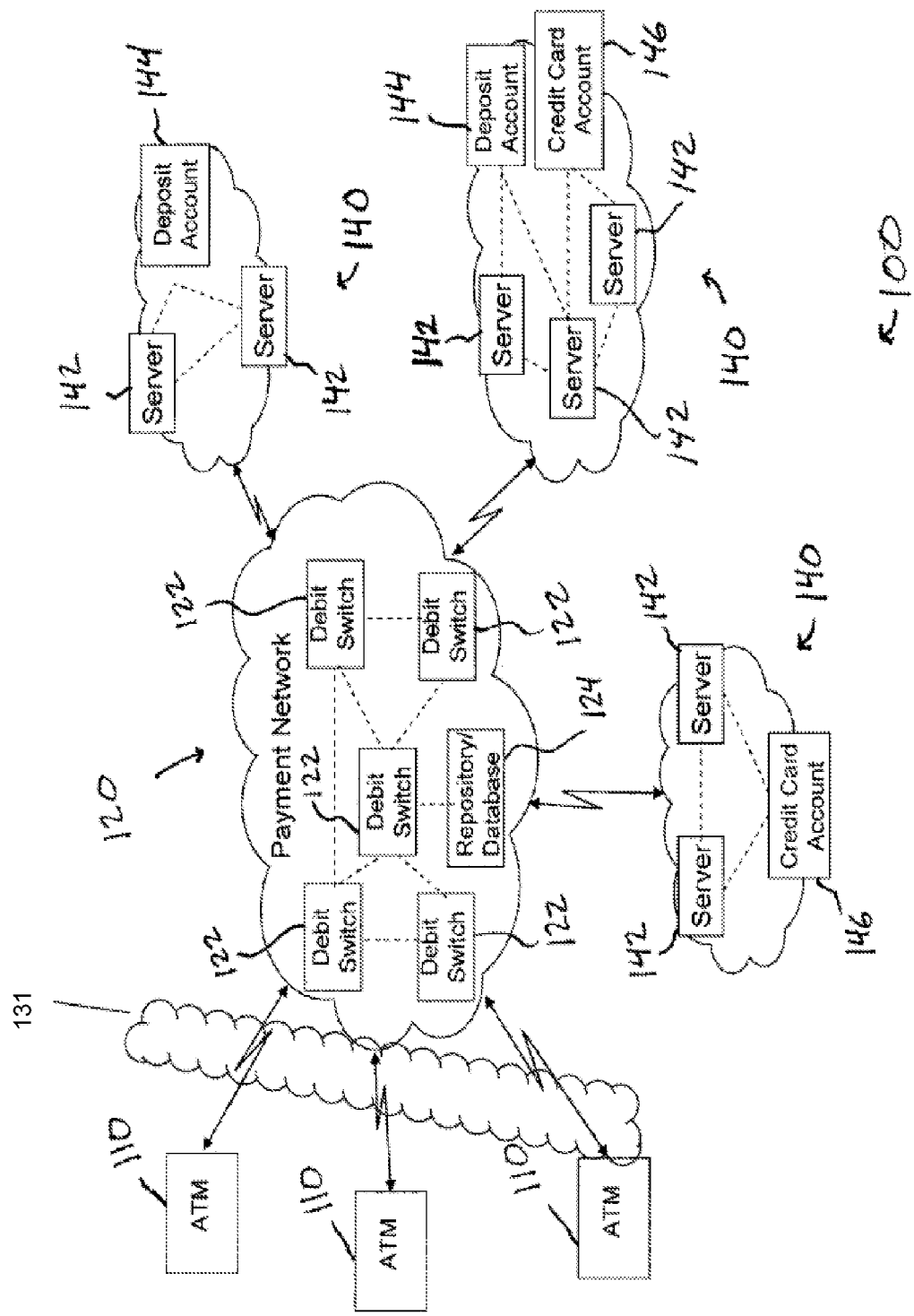
FIG. 1 is a high-level diagram illustrating an exemplary electronic transaction system in accordance with at least one embodiment disclosed herein.

FIG. 1 depicts an exemplary computer implemented secure transaction system, which in this example is an ATM transaction system 100 (hereinafter "payment processing system 100") that includes ATM terminals 110 (hereinafter "ATMs 110"), a payment network 120, and financial institution networks 140. It should be understood that intermediate networks, such as telecommunications network 131, can exist between the ATMs and the payment networks and financial institution networks. It should also be understood that the payment network 120 and financial institution networks 140 are not required to be separate components and can be combined into one or more back end system servers.

The payment processing system 100 can facilitate ATM transactions initiated by users of the ATMs 110. For example, a user can present a transaction card to be read at one of the ATMs 110 and can interact with the ATM to carry out transactions for receiving funds dispensed from the ATM, depositing funds into the ATM, receiving balance or statement information, electronic transfers of funds between accounts, and the like.

Transaction cards can include be debit cards, credit or prepaid cards having account information embedded therein. The account information can include a card number, the account holder's name, a card verification code, and the like. A debit card is a transaction card issued for a demand deposit account. A credit card is a transaction card issued for a credit card account. A prepaid card is a transaction card issued for a pre-funded account. Transaction cards can be formed using, for example, a plastic card with a magnetic stripe embedded with account information disposed thereon. The magnetic strips can be swiped at the ATM to allow the ATM to read the account information from the transaction cards.

The ATMs 110 can be configured to facilitate ATM transactions via the payment network 120 and the financial institution networks 140. The ATMs 110 read account information from transaction cards. To ensure that the user is the individual associated with the account information, the ATM can request the user to enter a personal identification number (PIN). The ATM can be configured to allow a user to submit transaction requests including cash withdrawals from accounts, cash or check deposits into accounts, fund transfers between accounts, balance inquiries for accounts, cash advances from accounts, and the like.

The ATM transfers the transaction requests to the payment network 120 for processing. The payment network 120 is communicatively coupled to the ATMs and the financial institution networks 140 to facilitate processing of ATM transactions. The payment network 120 can route transaction requests from the ATMs 110 to the appropriate financial institution network based on the transaction information included in the transaction request and can route transaction responses from the financial institution network to the ATMs 110. As shown, the payment network 120 can include debit switches 122, which are electronic devices in the payment network 120 for routing ATM transaction requests and ATM transaction responses between the ATMs 110 and the financial institution networks 140. The debit switches 122 interface with the ATMs 110 to provide initial processing of a transaction request by the payment network 120 and to forward a transaction response to the ATMs 110. The debit switches 122 are configured to route the transaction requests through the payment network 120 and ultimately to the appropriate one of the financial institution networks 140. The debit switches 122 can use transaction information included in the transaction request to determine how a transaction request should be routed. For example, the debit switches 122 can use at least a portion of the card number, such as a bank identification number (BIN), read from the user's transaction card by the ATM. A BIN typically includes the first six numbers of a transaction card number and can identify the financial institution that issued the transaction card, as well as the type of transaction card being used (e.g., credit, debit, prepaid). In some embodiments, the debit switches 122 can use transaction routing tables and/or an account association tables, which can be stored in the debit switches 122 and/or stored separate from the debit switches in one or more database devices 124 that are accessible by the debit switches 122, to determine the routing path and to determine to which one of the financial institution networks 140 the transaction requests should be routed. The transaction routing table can include route information identifying one or more routes a transaction request and/or transaction response can travel to reach a destination, such as a financial institution network or an ATM. The account association table can include account information, such as card numbers, account numbers, PINs, security codes, cardholder names, and the like. Accounts included in the account association table can allow a user to perform non-traditional ATM transactions.

The financial institution networks 140 can include one or more servers 142 to receive and process the transaction requests routed to them from the payment network 120, and to generate transaction responses to the transaction requests in accordance with rules and/or other predetermined parameters established by the financial institutions associated with the financial institution networks. The servers 142 are implemented using computing devices. In one embodiment, cardholders can have accounts, such as demand deposit accounts 144, including checking accounts and/or saving accounts, and/or can have credit card accounts 146 with one or more of the financial institutions associated with the financial institution networks 140.

The financial institution networks 140 can determine whether to process or deny/block the transaction requests received from the payment network 120. For example, as a preliminary matter, the financial institution network 140 (or alternatively the payment network 120) can determine whether to process or deny the transaction request by verifying whether the entered PIN matches a prescribed PIN that is stored in association with the cardholder's account information. The prescribed PIN can be stored in one or more databases accessible by the financial institution network 140, for example, as an entry an account association table. After the entered PIN is verified, the transaction request is further processed as would be understood by those skilled in the art. If the transaction is denied, a transaction response corresponding to the denial is transmitted to the ATM via the payment network 120. If the transaction request is accepted, a transaction response corresponding to the acceptance is transmitted to the ATM via the payment network 120. If the transaction request is approved, the financial institution can update the cardholder's account to reflect the transaction. By way of non-limiting example, if a user withdraws funds from a demand deposit account, the financial institution network can deduct the amount of the funds from the user's demand deposit account. Upon relaying the transaction response to the ATM, the ATM performs the service requested from the user, such as, for example, dispensing funds, accepting funds for deposit, providing an account balance, providing an account statement, and the like.

It should be noted that although much of the foregoing description has been directed to systems for processing ATM transactions using a debit card, the particular arrangement of networks (e.g., payment network 120, communication network 131, and financial institution networks 140), computing devices (e.g., ATM 110, debit switches 122 and servers 142) and the transaction processing steps are presented as a non-limiting, exemplary environment in which the systems and methods for facilitating guided passcode entry disclosed herein can be employed. It can be appreciated that the arrangement of computing devices and transaction processing steps can vary according to the particular type of secure transaction (e.g., credit card, debit card, prepaid card, NFC payment, electronic wallet, secure user log-in), as would be understood by those skilled in the art.

Figure 2:
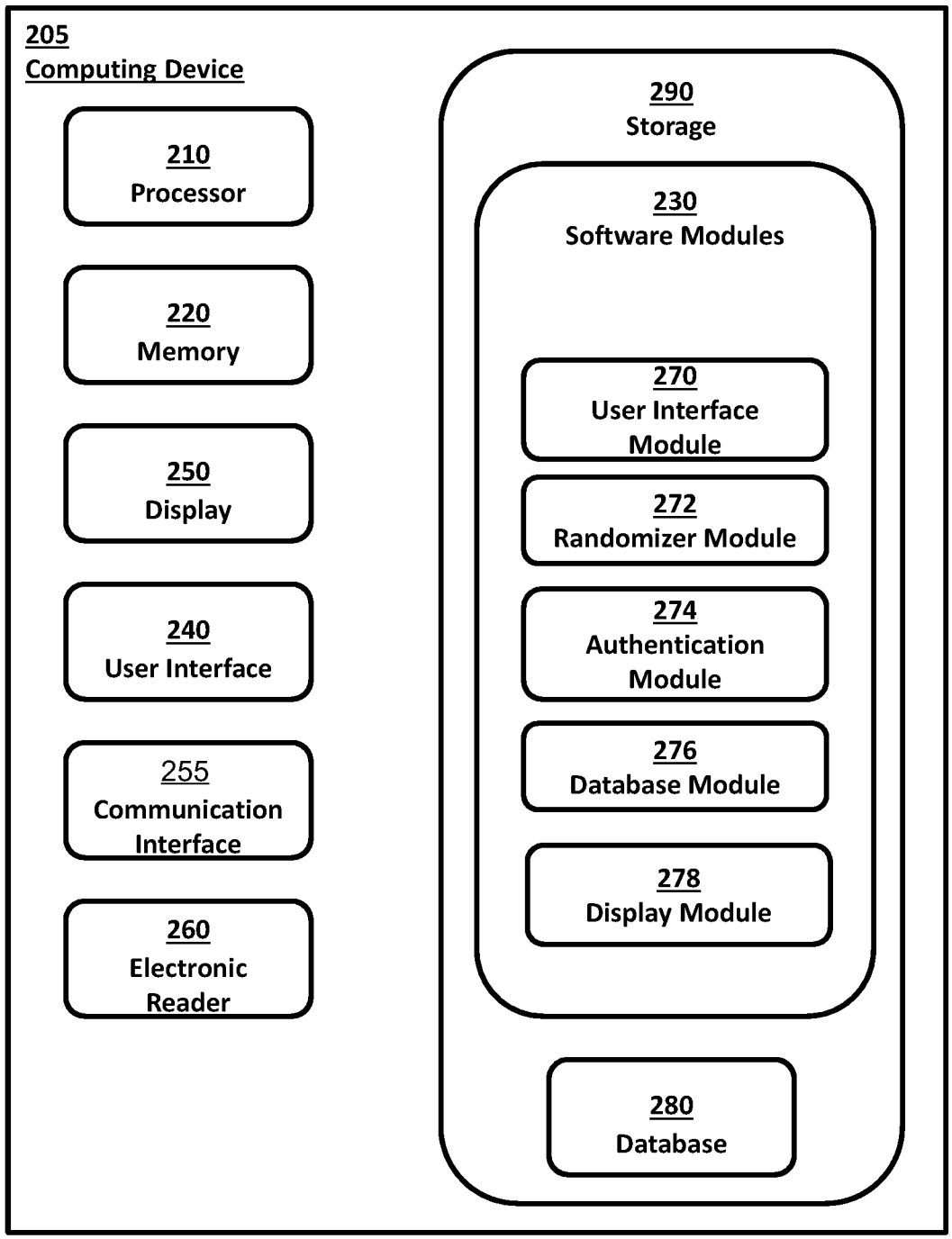
FIG. 2 is a block diagram of a computing device in accordance with at least one embodiment disclosed herein.

FIG. 2 is a high-level diagram illustrating an exemplary configuration of a computing device 205 that facilitates guided passcode entry in conjunction with a secure transaction processing system, for example, payment processing system 100. In one arrangement, computing device 205 can be an ATM (e.g., ATM 110 in FIG. 1). In other implementations, computing device 205 can be a server (not shown) that is part of the payment network 120 or financial institution networks 140. As a further alternative, computing device can be a personal computing device of a user, a point of sale (POS) device, such as a merchant POS device, a laptop computer, or a mobile device/smartphone, though it should be understood that computing device 205 can be practically any computing device and/or data processing apparatus capable of embodying the systems and/or methods described herein. It should also be understood that the systems and methods described herein are not limited to transaction processing systems and can be implemented in any computing environment that requires securely receiving private information from a user, preferably, for the purpose of verifying, authenticating or identifying the user according to the private information. It should also be understood that a passcode can include any log-in, private word, private key, PIN number or any such private string of characters, words or phrases known by a user and used for authentication, verification or identification.

Exemplary computing device 205 includes a processor 210 which is operatively connected to various hardware and software components that serve to enable operation of the payment processing system 100. The processor 210 serves to execute instructions to perform various operations relating to guided passcode entry and transaction processing as will be described in greater detail below. The processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more software modules 230 are encoded in the storage 290 and/or in the memory 220. The software modules 230 can comprise one or more software programs or applications having computer program code or a set of instructions executed in the processor 210. Such computer program code or instructions for carrying out operations for aspects of the systems and methods disclosed herein can be written in any combination of one or more programming languages, as would be understood by those skilled in the art. The program code can execute entirely on the computing device 205 as a stand-alone software package, partly on the computing device 205 and partly on a remote computing device, such as a payment network 120 server or a financial institution network 140 server (not shown), or entirely on such remote servers. In the latter scenario, the remote computer can be connected to the computing device 205 through any type of network, including a local area network (LAN) or a wide area network (WAN), or the connection can be made to an external computer (for example, through the Internet using an Internet Service Provider).

Preferably, included among the software modules 230 is a user interface module 270, an input randomizer module 272, an authentication module 274, a database module 276, and a communication module 278 that are executed by the processor 210.

It should be understood that in some illustrative embodiments, one or more of the software modules 230 can be downloaded over a network to the storage 290 from another device or system via the communication interface 255 for use within the payment processing system 100. For instance, program code stored in a computer readable storage device in a server can be downloaded over a network from the server to the storage 290.

Also preferably stored on the storage 290 is a database 280. As will be described in greater detail below, database 280 contains and/or maintains various data items and elements that are utilized throughout the various operations of the payment processing system 100, including but not limited to, PIN numbers and user account information, as will be described in greater detail herein. It should be noted that although the database 280 is depicted as being configured locally to the computing device 205, in certain implementations the database 280 and/or various of the data elements stored therein can be stored on a computer readable memory or storage medium that is located remotely (such as on a remote server that is part of the payment network 120 or the financial institution networks 140 of FIG. 1) and connected to the computing device 205 through a network (not shown), in a manner known to those of ordinary skill in the art.

A user interface 240 is also operatively connected to the processor. The interface can be one or more input device(s), such as switch(es), button(s), key(s), a touch-screen, as would be understood in the art of electronic computing devices. Interface serves to facilitate the capture of commands from the user, such as a user PIN number or user information and settings related to operation of the system for biometric authentication 100.

A display 250 is also operatively connected to the processor. The display 250 includes a screen or any other such presentation device that enables the system to instruct or otherwise provide feedback to the user regarding the operation of the payment processing system 100. By way of example, display 250 can be a digital display such as an LCD display, a CRT, or other such 2-dimensional display as would be understood by those skilled in the art.

By way of further example, the user interface 240 and the display 250 can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the person to interact with the device to enter data, control functions, etc. So when the touch screen is touched, interface communicates this change to processor, and settings can be changed or user entered information can be captured and stored in the memory.

One or more electronic readers 260 can be operatively connected to the processor 210. The electronic reader 260 serves to facilitate the capture of electronic information from the user, preferably, personal information, for example financial account information. For example, in the context of an ATM, the ATM can be equipped with a magnetic stripe reader for capturing user account information from a transaction card that is inserted into the reader 260 by the user. By way of further example, in the context of a point of sale device, the electronic reader can also be a NFC-enabled reader that can read financial account information from a NFC tag presented by the user. By way of further example, in the context of a computer controlled door lock, the electronic reader can be an RFID tag reader that can obtain user identifying information from an RFID tag presented by the user.

A communication interface 255 is also operatively connected to the processor 210. The communication interface 255 can be any interface that enables communication between the ATM 205 and external devices, machines and/or elements. In certain implementations, the communication interface 255 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device 205 to other computing devices and/or communication networks, such as private networks and the Internet. Such connections can include a wired connection or a wireless connection (e.g., using the 802.11 standard) though it should be understood that communication interface 255 can be practically any interface that enables communication to/from the processor 210.

At various points during the operation of the payment processing system 100, the computing device 205 can communicate with one or more remote computing devices, such as those servers controlled and/or maintained by one or more individuals and/or entities, such as a banking institution, payment provider or payment network. Such computing devices transmit and/or receive data to/from the computing device 205, thereby preferably initiating maintaining, and/or enhancing the operation of the guided passcode entry system 100, as will be described in greater detail below. It should be understood that the remote computing devices can be in direct communication with the computing device 205, indirect communication with the computing device 205, and/or can be communicatively coordinated with the computing device 205, as will be described in greater detail below. While such computing devices can be practically any device capable of communication with the computing device 205, in the preferred embodiment certain computing devices (e.g., that of the payment network 120) are servers, though it should be understood that practically any computing device that is capable of transmitting and/or receiving data to/from the computing device 205 could be similarly substituted.

The operation of the payment processing system 100 and the various elements and components described above will be further appreciated with reference to the method for facilitating guided passcode entry for facilitating a secure transaction as described below, in conjunction with FIGS. 3-6B.

Figure 3:
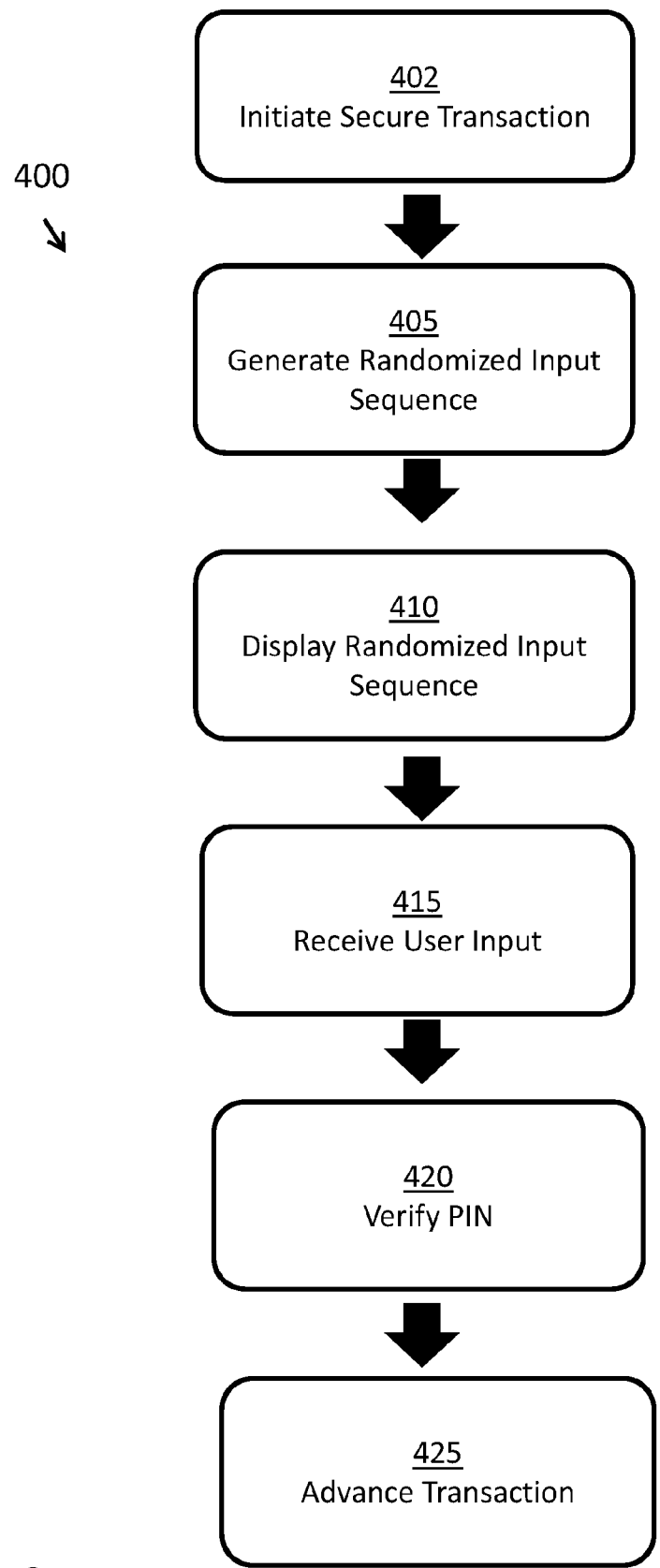
FIG. 3 is a flow diagram showing a routine that illustrates a broad aspect of a method for guided passcode entry in accordance with at least one embodiment disclosed herein.

FIG. 3 is an exemplary flowchart depicting a process 400 for guided passcode entry according to an exemplary embodiment. The process begins at step 402 in which a user initiates a secure transaction by providing personally identifiable information to the computing device 205. For example, in the context of an ATM, the user can present a transaction card to the ATM by inserting it into the electronic reader 260. The ATM can receive the account information, such as an account number, account-holder name, and the like, read from the transaction card. By way of further example, in the context of a POS device, the user can identify himself/herself by presenting a NFC communication device to the electronic reader 260 and wirelessly transmitting account information to the POS device. By way of further example, in the context of a user logging into a networked system, say, a secure website, the user can initiate the secure transaction by entering a username.

Then at step 405, responsive to initiation of the transaction, the processor 210 of computing device 205 executing one or more of the software modules 230, including, in certain implementations, the randomizer module 272, generates a "randomized" input sequence.

Traditionally, all PINS or passcodes, whether numerical or alphabetical have a prescribed input sequence where the characters are input serially from the first character in the sequence to the last. For example, a 4 digit user PIN number, say, "7892" is traditionally input serially, one number at a time starting with the first position in the input order, "7" followed by the second position, "8", followed by the third position, "9" and lastly the fourth position, "2". As such, each of the digits in the PIN have a prescribed input order ($1^{st}$, $2^{nd}$, $3^{rd}$, $4^{th}$) and a corresponding position in the order, e.g., $1^{st}$—"7", $2^{nd}$—"8", $3^{rd}$—"9" and $4^{th}$—"2".

The configured processor, can generate a "randomized" input sequence so as to create an input sequence that differs from the prescribed input order (1, 2, 3, 4) and as such provides an additional level of security in case an onlooker or video camera were monitoring the user interface 240 and unlawfully recording the user enter the PIN at the computing device 205. The randomized input sequence need not be truly random and, for example, can be generated by the configured processor by using a pseudo-random number generator that randomly reorders the prescribed input order 1, 2, 3, 4 to an arbitrary input sequence, for example, 2, 4, 1, 3. Preferably the randomized input sequence is a non-repeating random sequence of digits in the range 1 to N, wherein N is the number of prescribed passcode characters and each digit corresponds to one of the prescribed positions in the prescribed input order. Also, preferably, the randomized sequence does not omit any positions in the prescribed input order, for example, 2, 4, 4, 1, such that each digit is entered by the user for comparison to the stored PIN. Also, the sequence can be non-repeating, however, it should be understood that repeating input sequences and sequences that have more digits than the prescribed PIN can be generated, for example, 2, 4, 1, 1, 3. In a 4 digit PIN, randomly re-ordering the sequence provides 256 different input sequences, thereby making it significantly more difficult for an individual who captures the user's PIN from a single transaction to guess the PIN while trying to fraudulently access the user's account and PIN information.

It should be understood that the randomized input sequence can be generated by the configured processor 210 of the computing device 205 or alternatively, by a remote server, for example, one that is part of the payment network 120 or the financial institution network 140 and transmitted via a communications network and received by the communication interface 255. It should be understood that transmitting data (e.g., the input sequence or the user inputs) to and from the computing device can be performed using communication protocols, including without limitation, Short Message Service, Unstructured Supplementary Service Data or Interactive Voice Response.

Figure 4:
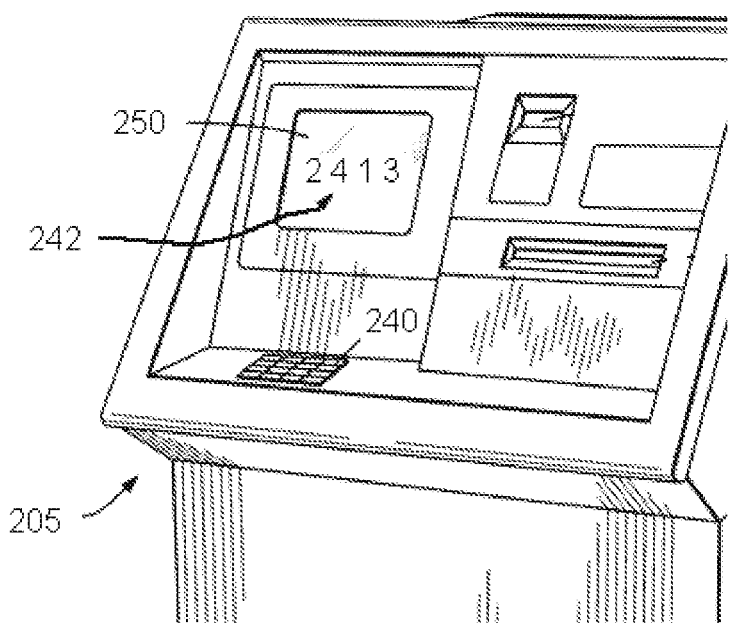
FIG. 4 depicts an exemplary display of a randomized input sequence on an ATM, in accordance with at least one embodiment disclosed herein.

Then at step 410, the processor 210 executing one or more of the software modules 230, including, in certain implementations, the user interface module 270, can present the "randomized" input sequence to the user. For example, as depicted in FIG. 4, the randomized input sequence 242 can be displayed by simply showing the re-ordered positions (e.g., 2, 4, 1, 3). Accordingly, the user is prompted to first input, on the user interface 240 (key-pad), the PIN digit that corresponds to the $2^{nd}$ position in the prescribed input order, followed by the PIN digit that corresponds to the $4^{th}$ position, followed by the PIN digit that corresponds to the first position and lastly the PIN digit that corresponds to the $3^{rd}$ position in the prescribed input order. Preferably, the randomized input sequence is presented to a user on a display 250 or area of the display 250 that is separate from the user interface 240 (e.g., key-pad) where the user enters the PIN because fraudsters typically focus a camera or attempt to view the user interface as opposed to the user interface and the display. It should be understood that alternative output devices can be used to present information to the user and receive input from the user via the computing device, for example, audio input/output devices or tactile input/output devices as would be understood by those skilled in the art.

Then, at step 415, the processor 210, which is configured by executing one or more of software modules 230, including, in certain implementations, the user interface module 270, receives an input of the user's PIN. The received PIN is input by the user into the user interface 240 (e.g., key-pad) of the computing device 205 and received as a plurality of "received PIN digits" each having a received position corresponding to the order in which they were input by the user and received by the configured processor 210. Returning to the example of the exemplary PIN, having the prescribed input order 1, 2, 3, 4 and corresponding prescribed PIN digits position $1^{st}$—"7", $2^{nd}$—"8", $3^{rd}$—"9" and $4^{th}$—"2". Presenting the randomized input sequence 2, 4, 1, 3, to the user should elicit the user's entry and receipt by the processor 210 of the received PIN digits 8, 2, 7, 9, in that order. In this example, the first position received PIN digit is "8"; the second position received PIN digit is "2"; the third position received PIN digit is "7"; and the fourth position received PIN digit is "9".

Figure 5A:
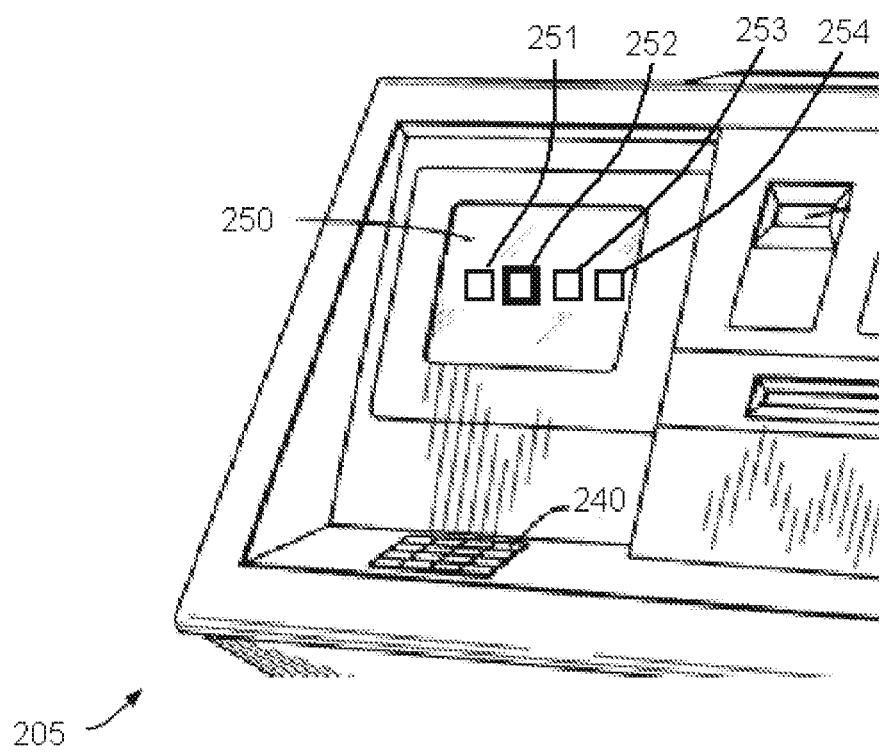
FIG. 5A depicts an exemplary display of a randomized input sequence on an ATM, in accordance with at least one embodiment disclosed herein.

Turning briefly to FIG. 5A, which depicts an alternative manner of prompting the user to input the user's PIN according to the randomized input sequence (e.g., PIN digit positions 2, 4, 1, 3) and receiving the user input. As shown in FIG. 5A, the configured processor can present on the display 250, a form that includes a plurality of distinct areas 251-254, which in this example are boxes. Preferably, each of the boxes corresponds to one of the positions in the prescribed input order. As mentioned above, the prescribed input order is typically PIN digit positions (1, 2, 3, 4). Display of the boxes in the exemplary left to right arrangement is similar to how a conventional ATM displays blanks, dashes, boxes or other such indicators alerting the user that each area corresponds to a digit of the PIN to be entered by the user. In this example, the leftmost area 251 corresponds to the first position in the prescribed input order (i.e., first digit of the user's PIN), area 252 corresponds to the second position (i.e., second digit of the user's PIN), area 253 corresponds to the third position (i.e., third digit of the user's PIN), and area 254 corresponds to the fourth position in the prescribed input order (i.e., fourth digit of the user's PIN).

Figure 5B:
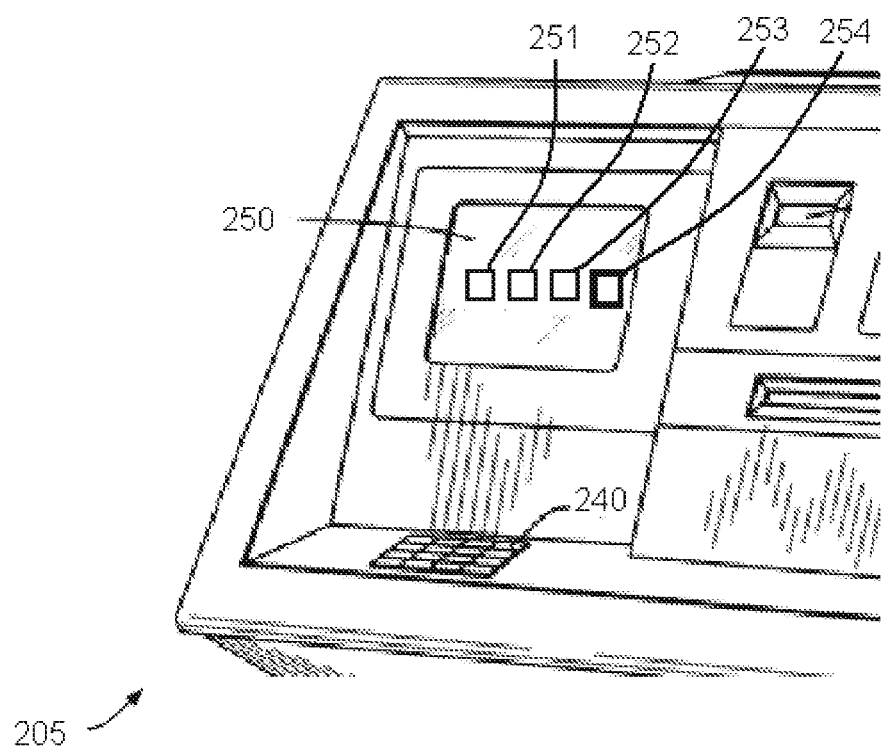
FIG. 5B depicts an exemplary display of a randomized input sequence on an ATM, in accordance with at least one embodiment disclosed herein.

In one implementation, the configured processor can prompt the user to input the user's PIN according to the randomized input sequence by highlighting the boxes according to the randomized input sequence (PIN positions 2, 4, 1, 3). Since the first PIN digit to be entered according to the rearranged input sequence is the PIN digit that is normally in the $2^{nd}$ position, as shown in FIG. 5A, the second area 252 is highlighted to prompt the user to input the PIN digit which corresponds to the $2^{nd}$ position in the prescribed input order. As depicted in FIG. 5B, after receipt of the user input, the configured processor can highlight another distinct area according to the randomized input sequence. In this example, the fourth area 254 is highlighted to prompt the user to input the PIN digit which corresponds to the $4^{th}$ position. This process can be repeated iteratively for the entire randomized input sequence.

It should be understood that alternative methods of displaying the input sequence or prompting user input are possible. For example, each digit in the randomized input sequence can be displayed on a different portion of the screen so as to make it more difficult for an onlooker to view the input sequence. Moreover, the randomized sequence can be provided to the user via an alternative means to the display 250. For example, one or more notifications (such as an e-mail or SMS message) containing the sequence can be generated and/or transmitted to the user.

At step 420, the processor 210, which is configured by executing one or more of the software modules 230, including, in certain implementations, the authentication module 274, verifies that the PIN matches a PIN stored in the database. More specifically, the configured processor can test the received data against a database of PINS associated with a plurality of account holders for an exact match. The testing step can include comparing the received PIN digits to the particular PIN associated with the account holder (e.g., the user) stored in the database 280. The received PIN is compared in accordance with the randomized input sequence and in regard to the order that the input data was received.

By way of illustration, in certain implementations, using the account information read from the user's debit card, the configured processor can query the database 280 for the prescribed PIN number stored therein and associated with the account information. For example, the prescribed PIN can be stored in the database 280 as an entry an account association table. The account association table can include information such as card numbers, account numbers, prescribed PINS, security codes, account holder names, and the like. Preferably, each prescribed PIN is stored in a prescribed input order. For each of the received PIN digits having a particular received position, verification includes comparing the received PIN digit to the prescribed PIN digit having a prescribed position that is equivalent to the particular received position transposed according to the randomized input sequence.

As an alternative, the received PIN digits can be re-ordered according to the randomized input sequence prior to comparing the received PIN digits to the particular PIN associated with the account information. As such, the re-ordered received PIN digits can be directly compared to the corresponding prescribed PIN digits.

It should be understood that the computing device 205 and/or remote computing devices (e.g., back-end servers that are part of the payment network 120 and/or the financial institution network 140) can verify whether the received PIN matches a prescribed PIN stored in the database. Similarly, one or more steps involved in verifying a PIN, e.g., re-ordering and/or comparing, can also be performed by the computing device 205 and/or a remote computing device. For example, the computing device 205 can re-order the received PIN according to the randomized input sequence and transmit the re-ordered received PIN to a remote computing device for comparison to the particular PIN associated with the account holder.

Typically, in ATM transactions, the verification/testing of a received passcode with stored passcodes can be performed using a hardware security module (HSM) residing in the payment network 120 and/or financial institution network 140 (not shown). The HSM receives (1) the received PIN and (2) and an encrypted PIN previously stored in a memory (e.g., a database), and the HSM outputs the result of testing/verification. However, it should also be understood that various computing devices or modules can perform the testing step in accordance with the disclosed embodiments.

At step 425, the processor 210, which is configured by executing one or more of the software modules 230, including, in certain implementations, the authentication module 274, causes the secure transaction at the terminal to advance in response to any exact match of the received PIN to the prescribed PIN. Advancing the transaction can include authorizing the transaction, displaying user options and the like as would be understood by those skilled in the art. In the event of a non-match, the configured processor can cause the display 250 to notify the user with an error message and can prompt the user to re-enter the user's PIN according to the previously generated randomized sequence. Alternatively, in the event of failure, the configured processor can repeat steps 415-425 or variations thereof.

At this juncture, it should be noted that although much of the foregoing description has been directed to systems and methods for guided passcode entry to facilitate secure transactions, the systems and methods disclosed herein can be similarly deployed and/or implemented in scenarios, situations, and settings far beyond the referenced scenarios. It can be readily appreciated that the systems and methods for facilitating guided passcode entry described in the context of a payment processing system 100 can be effectively employed in practically any scenario where entry of a PIN number, log-in, password or other such sensitive information is done in an open or public space where it is more challenging to enter such sensitive information in a secure manner. It should be further understood that any such implementation and/or deployment is within the scope of the systems and methods described herein. Moreover, the references herein to ATM transactions should be understood to be exemplary, and thus non-limiting. As such, it can be further appreciated that the methods and systems described herein can be readily adapted towards the facilitation of the receipt of a PIN, for example at a point of sale device where a payment card or NFC device is used. Additionally, it should be understood that payment processing system 100 is referred to as such in the interests of simplicity and clarity, however, in certain implementations, payment processing system 100 can be configured such that it enables any number of operations described herein (e.g., generating a randomized input sequence, authenticating, etc.), even if such operations do not directly pertain to payment processing transactions.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for facilitating guided passcode entry. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method for guided entry of a passcode by a user in connection with a secure transaction at a terminal, the passcode being stored in a database and known to the user and being prescribed to have a number of characters that each have a prescribed position in a prescribed input order, the method comprising:

receiving a randomized input sequence at the terminal, wherein the randomized input sequence is a randomly arranged sequence of digits in the range 1 to N, wherein N is the number of characters in the passcode and wherein each digit corresponds to one of the prescribed positions in the prescribed input order such that the randomized input sequence defines a randomized order for the user to input the characters of the passcode;

presenting the randomized input sequence to the user at the terminal and prompting the user to input the passcode according to the prescribed input order and the randomized order;

receiving input data at the terminal from the user comprising characters of the passcode, wherein the characters of the passcode are input by the user and received at the terminal in an order;

reordering, the input data in accordance with the randomized input order presented to the user and in regard to the order that the characters of the passcode were received at the terminal;

causing a test of the reordered input data against a database of passcodes associated with a plurality of users for an exact match, wherein the test comprises comparing the passcode associated with the user stored in the database to the characters of the input data reordered in accordance with the randomized input order; and advancing the secure transaction at the terminal in response to any exact match of the received input data to the passcode.

2. The method of claim 1, the step of presenting the randomized input sequence comprises displaying the randomized input sequence on a screen of the terminal.

3. The method of claim 1, wherein the step of receiving the randomized input sequence further comprises generating the randomized input sequence using code executing in a processor at the terminal.

4. The method of claim 1, wherein the terminal is an automated teller machine (ATM).

5. The method of claim 1, wherein the randomized input sequence is generated by the terminal using a pseudo-random number generator.

6. The method of claim 1, wherein the step of receiving the randomized input sequence further comprises receiving the randomized input sequence from a remote computing device.

7. The method of claim 6, wherein the remote computing device is a remote server.

8. The method of claim 5, wherein presenting the randomized input sequence comprises: transmitting the randomized input sequence to a user computing device according to a communication protocol for presentation to the user using the user computing device.

9. The method of claim 1, wherein the input data comprises a plurality of received passcode characters having a received position corresponding to the order of receipt.

10. The method of claim 1, wherein the randomized input sequence is a randomly arranged sequence of digits, each having respective values in the range 1 to N, wherein N is the number of prescribed passcode characters and wherein each digit corresponds to one of the prescribed positions in the prescribed input order.

11. The method of claim 10, the step of presenting the randomized input sequence further comprising:

iteratively displaying each of the digits according to the randomly arranged sequence, thereby prompting the user to enter, for each of the displayed digits, a particularly prescribed passcode character having a particular prescribed position that corresponds to the displayed digit.

12. The method of claim 10, the step of presenting the randomized input sequence further comprising:

displaying a plurality of distinct areas on a display, each of the areas corresponding to one of the prescribed positions in the prescribed input order; and iteratively highlighting the prescribed positions that correspond to the respective values of the digits of the randomized input sequence, thereby prompting the user to input, for each of the highlighted positions, the corresponding prescribed passcode character.

13. The method of claim 1, wherein the test further comprises:

for each of the received characters of the passcode, comparing a particular received character having a particular received position to one of the plurality of prescribed passcode characters having a prescribed position that is equivalent to the particular received position arranged according to the randomized input sequence.

14. The method of claim 1,
wherein the re-ordering step is performed at the terminal.

15. The method of claim 1, the step of causing the test of the input data further comprising:

transmitting the received input data to a remote computing device according to a communication protocol.

16. A method for guided entry of a passcode by a user in connection with a secure transaction, using a computing device having a storage medium a processor executing instructions therein, the passcode being stored in a database and known to the user and being prescribed to have a number of characters that each have a prescribed position in a prescribed input order, the method comprising:

establishing a randomized input sequence, wherein the randomized input sequence is a randomly arranged sequence of digits in the range 1 to N, wherein N is the number of characters in the passcode and wherein each digit corresponds to one of the prescribed positions in the prescribed input order such that the randomized input sequence defines a randomized order for the user to input the characters of the passcode;

presenting the randomized input sequence to the user via the terminal thereby prompting the user to input the passcode according to the prescribed input order and the randomized order;

receiving input data over a network from a remote terminal being used by a user in connection with the transaction, the input data comprising characters of the passcode input by the user at the terminal and received by the terminal in an order;

reordering, the input data in accordance with the randomized input order presented to the user and in regard to the order that the characters of the passcode were received by the terminal;

testing the reordered input data against a database of passcodes associated with a plurality of user for an exact match, wherein the resting step comprises comparing the passcode associated with the user stored in the database to the characters of the input data reordered in accordance with the randomized input sequence;

causing the secure transaction at the terminal to advance in response to any exact match of the received input data to the passcode otherwise causing the terminal to display an error message.

* * * * *